United States Patent

[11] 3,610,572

| [72] | Inventor | Edward J. Swearingen<br>San Antonio, Tex. |
|---|---|---|
| [21] | Appl. No. | 875,389 |
| [22] | Filed | Nov. 10, 1969 |
| [45] | Patented | Oct. 5, 1971 |
| [73] | Assignee | Swearingen Aircraft<br>San Antonio, Tex. |

[54] DRAIN VALVE ASSEMBLY
10 Claims, 6 Drawing Figs.

[52] U.S. Cl. .................................................. 251/144,
137/590
[51] Int. Cl. ..................................................... F16k 51/00
[50] Field of Search.......................................... 251/144;
244/135; 137/590

[56] References Cited
UNITED STATES PATENTS

| 1,135,254 | 4/1915 | Bloxham ..................... | 251/144 |
| 2,650,781 | 9/1953 | Taylor .......................... | 244/135.5 UX |
| 2,801,061 | 7/1957 | Logan ........................... | 244/135 |
| 2,881,791 | 4/1959 | Henneman ................... | 251/144 X |
| 3,026,897 | 3/1962 | Derrington et al............ | 251/144 X |
| 3,097,663 | 7/1963 | Buchwald..................... | 251/144 X |
| 3,145,968 | 8/1964 | Marx............................. | 251/144 |

FOREIGN PATENTS

| 1,132,441 | 6/1962 | Germany...................... | 244/135 |

*Primary Examiner*—M. Cary Nelson
*Assistant Examiner*—Michael O. Sturm
*Attorney*—Birch, Swindler, McKie & Beckett ABSTRACT: A drain valve assembly which is to be installed on the interior of an integral aircraft fuel tank of the type where the skin of the aircraft is also the wall of the tank. When mounted the valve is wholly within the tank with the exception of an operating means for opening the valve which lies flush with the outer surface of the skin. The valve normally closes an orifice in the skin section that forms the tank, however, when pushed inwardly into the tank, it opens the orifice to permit drainage.

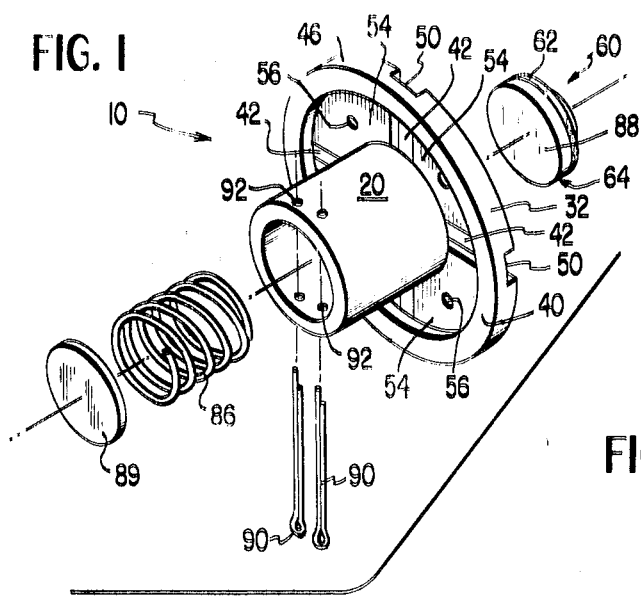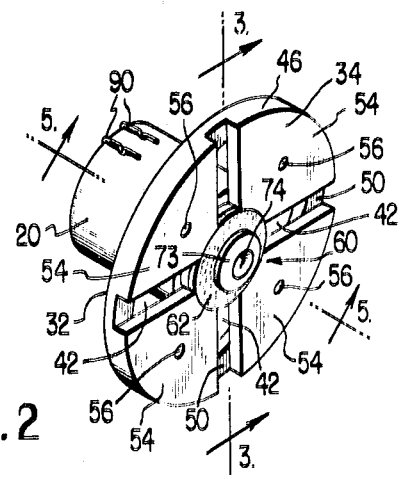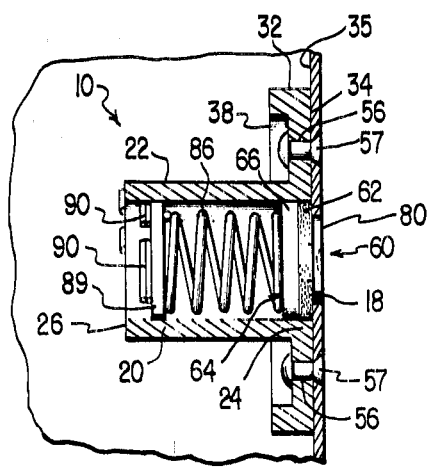
INVENTOR
EDWARD J. SWEARINGEN 3,610,572

DRAIN VALVE ASSEMBLY

BACKGROUND OF THE INVENTION

Field of the Invention

This invention relates to a drain valve assembly for an integral fuel tank and more particularly to a drain valve that is flush with the exterior of the tank but which permits complete drainage of the contents of the tank so as to leave no liquid or sediment.

Description of the Prior Art

In modern aircraft, fuel tanks are frequently made so that they are integral with the skin of the aircraft, that is, rather than having a completely enclosed separate compartment within the confines defined by the aircraft skin, at least a portion of the tank wall is comprised of the skin of the aircraft itself.

In fuel tanks for aircraft consisting of complete containers that were supported within the skin of the fuselage or wings, the drainage valves for the tanks presented no external protrusions since a removable plate covered the spout and operating members. However, with an integral fuel tank the prior art type of drain valve is not suitable since if it is installed in an ordinary manner, it will project beyond the skin of the aircraft. This is undesirable since the projection will cause drag which will retard the speed of the aircraft.

The drain valve assembly disclosed herein overcomes the deficiency of prior art drain valves by providing a valve assembly which can be installed in the interior of a fuel tank adjacent a small orifice in the skin of the aircraft so that it is entirely within the tank. An operator which is movable into the tank to permit complete drainage has its outward movement limited so that it normally lies in the same plane as the skin thus providing a smooth aerodynamic surface.

SUMMARY OF THE INVENTION

Generally the invention comprises a drain valve assembly for use in a fuel tank for an aircraft type where the skin of the aircraft comprises a wall of the tank and an orifice is provided in the wall in draining relation to the tank. The valve comprises wall means defining an elongated housing having a first end and a second end with a portion of the housing near the first end defining a first conduit adapted to be connected to the orifice.

At the first end of the housing the wall means includes a plurality of second conduits disposed transversely of the first conduit which are adapted to connect the interior of the tank to the orifice and stopper means, operable to normally close the orifice, is disposed in the housing for axial movement in the first conduit.

BRIEF DESCRIPTION OF THE DRAWING

FIG. 1 is an exploded perspective view of the drain valve assembly showing various components thereof in their general relation to each other;

FIG. 2 is a perspective view of the drain valve assembly shown in FIG. 1 from the opposite end;

FIG. 3 is a sectional view of the drain valve assembly taken along line 3—3 of FIG. 2;

FIG. 4 is a sectional view of the drain valve assembly taken along line 3—3 of FIG. 2 with the valve opened;

FIG. 5 is a view of the drain valve assembly taken along line 5—5 of FIG. 2 showing the valve housing and flange in section; and FIG. 6 is an enlarged sectional view of the stopper means for the drain valve assembly.

DESCRIPTION OF A PREFERRED EMBODIMENT

The invention can best be described by referring to FIGS. 1 and 3 wherein a drain valve assembly 10 constructed in accordance with a preferred form of the invention is shown connected to that portion of the aircraft skin 12 that forms a wall of an integral fuel tank 14. The valve is mounted adjacent an orifice 18 formed in the skin 12 which serves as a drainage outlet for the fuel tank. Preferably the valve assembly 10 is located at the bottom of the fuel tank as illustrated to enable complete drainage of the tank of all liquid and sediment.

The entire valve assembly which is wholly within the interior of the fuel tank is of sufficiently small dimension that it takes up a relatively small volume, and thus does not substantially reduce the capacity of the tank. For example, the preferred embodiment of the invention, is slightly more than 1½ inches wide and its height is less than 1 inch.

The drain valve assembly 10 comprises elongated wall means 22 forming an elongated cylindrical housing 20 that includes a first end 24 mounted to the skin of the aircraft and a second end 26 in the interior of the tank. As illustrated in FIG. 3, wall means 22 are cut away at regular arcuate intervals at first end 24 to form a plurality of radially directed conduits 30.

A radially extending flange 32 is integrally connected to the housing 20 at first end 24. The flange has a first surface 34 adapted to lie against the interior surface 35 of the portion of the skin 12 that forms the fuel tank 14. The central portion 38 of the flange is of reduced thickness relative its circumference where an annular lip 40 provides additional thickness.

The central portion 38 of flange 32 is provided with a plurality of radially extending conduits 42 which are preferably slots that divide the central portion into a plurality of segments 54 and which are in communication with each of the radial conduits 30 at the first end of the housing. While the drawing shows only four slots in the flange, it is, of course, to be understood that additional slots could be provided. However, an excessive number could weaken the connection between the housing 20 and flange 32 and thus should be avoided.

While radial conduits 42 extend from conduits 30 to the outer wall 46 of lip 40, the additional thickness of that lip closes one side of the slot thereby forming a radially extending channel 50 coextensive with the width of annular lip 40.

Thus, each conduit 30 at the first end 24 of elongated housing 20 is connected to a radially extending slot 42 located in the central portion of the flange and then to a radially extending channel 50 located at the periphery of the flange.

In addition to forming the channels 50, the additional thickness provided by annular lip 40 also unites the various segments 54 of the flange which are formed by the conduits 42 and thus contributes toward the physical integrity of the assembly. Each of the segments 54 is provided with a suitable hole 56 so that the valve can be connected to the aircraft by rivets 57 or other suitable means.

The interior of the valve assembly includes stopper means 60 (FIG. 6) which comprises a resilient sealing member 62 which is mounted on a rigid operator 64. The operator 64 has a first disclike retainer 66 of substantially the same cross-sectional configuration as the interior of housing 20 including a front wall 70 that supports a forwardly extending projection 72 having a reduced cross section. Reduced projection 72 carries a substantially circular operating face 73 at its end having a generally circular depression or recess 74 at its center. Sealing member 62 which is preferably a washer having the same cross-sectional dimension as retainer 66 and having a central opening 76, is mounted on reduced projection 72 between front wall 70 of first disclike retainer 66 and rear wall 69 of circular operating face 73.

Sealing member 62 is substantially larger than orifice 18 so that when it abuts the inside wall of the tank it shuts off flow through the orifice. While the operating face 73 is substantially smaller than sealing member 62 it is only slightly smaller than orifice 18 so that it substantially fills the orifice 18 in the closed position of the valve assembly. In addition, while the sealing member 62 lies wholly behind skin 12, operating face 73 is substantially the same thickness as the skin so that its outer face 80 lies flush with the outer surface 82 of the skin (FIG. 3) when the valve is closed.

The sealing member 62 of the valve is held against the skin in its normally closed position by a suitable resilient member such as coiled helical spring 86 disposed in the interior of the housing 20 and having one end against rear wall 88 of retainer 66 and having its other end against a retaining member 89 which is held in a fixed position at the second end of the housing by cotter pins 90 installed in suitable holes 92.

The operation of the invention can best be explained by reference to FIG. 4 wherein a drain valve assembly constructed in accordance with the above description is installed on the interior of integral fuel tank adjacent on orifice 18 therein. The valve is opened by inserting a suitable operator 94 into recess 74 in the operating face 73 and then pushing the operator and sealing member 62 rearwardly into the housing against the force of spring 86. Drainage from the fuel tank through the valve commences when the sealing member 62 moves away from orifice 18. During drainage some of the effluent flows through slots 42, conduits 30 and then into the first end of the housing 20 which now serves as a transverse conduit 93 and then out the orifice. Additional effluent also flows through channels 50 before it enters slots 42 and the conduits 30. In this regard it should be observed that the invention could be constructed without the utilization of annular lip 40, and in that form of the invention the flow would be only through slots 42 to conduits 30 and transverse conduit 93 to orifice 18. In the alternative the drainage valve assembly could be constructed having a flange which is the same thickness as the relatively annular lip 40. If this construction is preferred then all the flow is through channels 50 to conduits 30, and the transverse conduit 93 at the first end of the housing.

The valve assembly is closed by removing operator 94 and allowing sealing member 62 to close orifice 18 under the force of spring 86.

In addition it should be observed that the valve need not be connected to the skin of the aircraft by the preferred rivets as illustrated in the figures, but in fact could be welded thereto, or bracing means installed around the housing could be riveted to the tank and additional slots and channels could be formed in the flange in lieu of the rivet holes 56.

While the invention has been described with particular reference to the embodiment illustrated and described in detail in the specification it should be understood that many obvious modifications of this device would be obvious to those skilled in the art in light of the foregoing specification and drawings. Therefore, the scope of the invention should not be limited by the foregoing detailed description of a preferred embodiment, but rather should be limited only by the scope of the claims appended hereto.

I claim:

1. A drain valve assembly for use in the interior of an aircraft fuel tank of the type where the skin of the aircraft comprises a wall of the tank and an orifice is provided therein comprising wall means for forming an elongated housing having a first end and a second end;

a portion of said housing near said first end defining a first conduit adapted to be in communication with said orifice;

a plurality of second conduits formed in said wall means at said first end, said second conduits being disposed transversely of said first conduit and adapted to connect the interior of said tank to said first conduit;

stopper means disposed in said housing for axial movement in said first conduit, said stopper means being operable to normally close said orifice; and said stopper means including an operating face in said orifice, the outer face of the operating face being substantially flush with the skin of the aircraft.

2. A drain valve assembly as defined in claim 1 including a radially extending flange connected to said first end; said flange defining a plurality of radially disposed third conduits; and at least one of said third conduit means is in communication with at least one of said second conduits.

3. A drain valve assembly as defined in claim 2 wherein said third conduits comprise a plurality of radially disposed slots in said flange.

4. A drain valve assembly as defined in claim 2 wherein said third conduits comprise a plurality of radially disposed channels formed in said flange; and the open portion of said channels is adapted to reside in facing relation with said wall.

5. A drain valve assembly as defined in claim 3 including a substantially continuous lip disposed at the perimeter of said flange to interconnect the portions of said flange formed by said slots.

6. A valve as defined in claim 5 wherein said third conduit includes a plurality of radially disposed channels formed in said lip with the open portion of said channels adapted to reside in facing relation with said wall of said tank; and at least one of said channels is in communication with at least one of said slots.

7. A valve as defined in claim 1 wherein said stopper means includes a substantially rigid operator adapted to be normally flush with the exterior of said wall of said tank; and a sealing member mounted on said operator and adapted to normally be disposed at said first end whereby said orifice is closed.

8. A drain valve assembly as defined in claim 7 wherein said operator includes a first retaining portion carrying an intermediate portion which supports the operating face, the outer face of which is flush with the exterior of said wall of said tank; and said sealing member has a centrally disposed opening which is disposed about said intermediate portion of said operator so that axial movement of said operating face toward said second end causes said sealing member to open said orifice.

9. A drain valve assembly as defined in claim 8 including resilient means in said housing for urging said operator and said sealing member into engagement with said wall to normally close said orifice.

10. A drain valve assembly as defined in claim 9 including second retaining means disposed at said second end of said chamber;

said yieldable means being interposed between said first retaining portion of said operator and said second retaining means.